(12) United States Patent
Varela et al.

(10) Patent No.: US 9,338,265 B2
(45) Date of Patent: May 10, 2016

(54) MOBILE DEVICE TO OPERATE IN TABLET MODE AND PHONE MODE

(75) Inventors: Alex Varela, Phoenix, AZ (US); Kyle Deatherage, Phoenix, AZ (US); George Cleveland, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 14/006,713

(22) PCT Filed: Dec. 29, 2011

(86) PCT No.: PCT/US2011/067768
§ 371 (c)(1),
(2), (4) Date: Sep. 23, 2013

(87) PCT Pub. No.: WO2013/101030
PCT Pub. Date: Jul. 4, 2013

(65) Prior Publication Data
US 2014/0011548 A1     Jan. 9, 2014

(51) Int. Cl.
*H04M 1/02* (2006.01)
*H04B 1/3888* (2015.01)
*G06F 1/16* (2006.01)

(52) U.S. Cl.
CPC ............. *H04M 1/0212* (2013.01); *G06F 1/162* (2013.01); *G06F 1/1649* (2013.01); *G06F 1/1679* (2013.01); *G06F 1/1681* (2013.01); *H04B 1/3888* (2013.01); *H04M 1/0247* (2013.01); *H04M 1/0216* (2013.01)

(58) Field of Classification Search
CPC ................................................... H04M 1/0212
USPC ........................................................ 455/566
See application file for complete search history.

(56) References Cited

U.S. PATENT DOCUMENTS

| | | | |
|---|---|---|---|
| 2009/0091512 A1* | 4/2009 | Jung et al. | 345/1.1 |
| 2010/0238620 A1* | 9/2010 | Fish | 361/679.09 |
| 2011/0126141 A1* | 5/2011 | King et al. | 715/769 |
| 2012/0069502 A1* | 3/2012 | Lauder et al. | 361/679.01 |
| 2012/0127061 A1* | 5/2012 | Pegg | 345/1.1 |
| 2012/0256929 A1* | 10/2012 | Koenig et al. | 345/503 |
| 2013/0077236 A1* | 3/2013 | Becze et al. | 361/679.56 |

FOREIGN PATENT DOCUMENTS

| | | |
|---|---|---|
| KR | 10-2007-0066808 A | 6/2007 |
| KR | 10-2008-0035709 A | 4/2008 |
| KR | 10-0837294 B1 | 6/2008 |
| WO | 2013/101030 A1 | 7/2013 |

OTHER PUBLICATIONS

International Search Report dated Jun. 1, 2012 for corresponding Application No. PCT/US2011/067768.
International Preliminary Report on Patentability and Written Opinion received for PCT Patent Application No. PCT/US2011/67768, mailed on Jul. 10, 2014, 7 pages.

* cited by examiner

*Primary Examiner* — Marisol Figueroa
*Assistant Examiner* — Jean Chang
(74) *Attorney, Agent, or Firm* — KED & Associates LLP

(57) ABSTRACT

A mobile device is provided that may switch between a first arrangement and a second arrangement. The mobile device may include a communication device to provide wireless communication. A first panel may be provided having a display, and a second panel may be provided having a display. A first hinge device may couple the first panel to the second panel. A first magnet may be provided at or near a side surface of the first panel, and a second magnet may be provided at or near a side surface of the second panel.

22 Claims, 4 Drawing Sheets

MOBILE DEVICE TO OPERATE IN TABLET MODE AND PHONE MODE

BACKGROUND

1. Field

Embodiments may relate to a mobile device that operates in a phone mode and in a tablet mode.

2. Background

Mobile devices used for wireless communication include a fixed size display. Tablets (or tablet computers) also include a display. However, tablets may have a different height-width ratio as compared to a mobile device.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
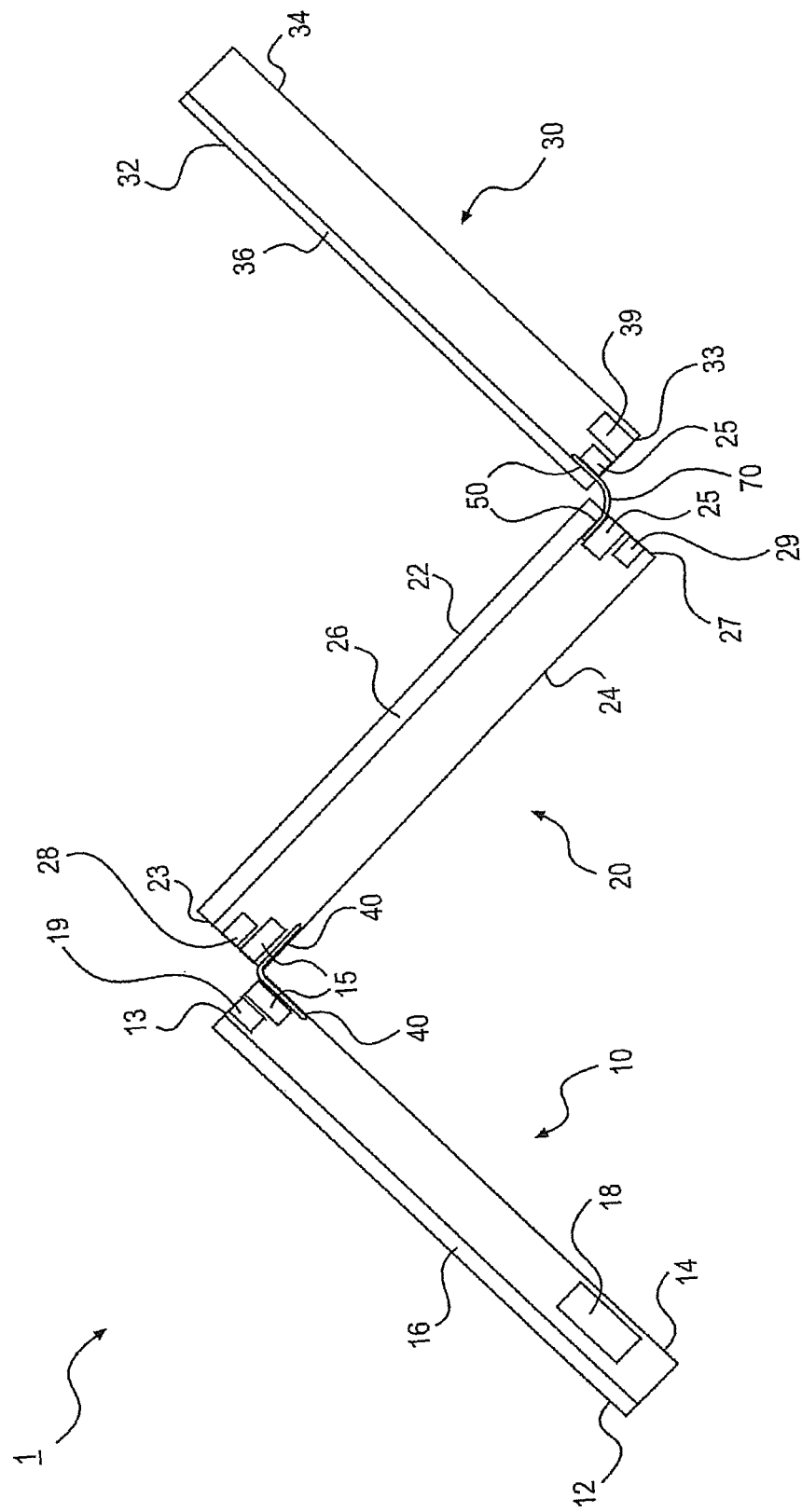
FIG. 1 shows a mobile device in a semi-opened state according to an example embodiment.

FIG. 1 shows a mobile device in a semi-opened state according to an example embodiment. Other embodiments and configurations may also be provided. This figure shows a semi-opened state since it is easy to identify and describe parts/components/elements in this type of drawings.

More specifically, FIG. 1 shows a mobile device 1 having a first panel 10, a second panel 20 and a third panel 30. The first panel 10 may be coupled to the second panel 20 by a first hinge device 15. The second panel 20 may be coupled to the third panel 30 by a second hinge device 25.

The first panel 10 may include a first surface 12 (or top surface), a second surface 14 (or bottom surface) and a side surface 13 between the first surface 12 and the second surface 14. The first panel 10 may include a display 16 on the first surface 12.

The first panel 10 also includes electronic components of a mobile device (or mobile terminal) such as a wireless communication device 18 to allow wireless communication. The first panel 10 may also include a controller to control operations of the mobile device 1. The mobile device 1 may include a transmitting device to transmit a wireless signal and/or the mobile device 1 may include a receiving device to receive a wireless signal.

The second panel 20 may include a first surface 22, a second surface 24, a first side surface 23 between the first surface 22 and the second surface 24, and a second side surface 27 between the first surface 22 and the second surface 24. The second panel 20 may also include a display 26 on the first surface 22 of the second panel 20.

The third panel 30 may include a first surface 32, a second surface 34 and a side surface 33 between the first surface 32 and the second surface 34. The third panel 30 may also include a display 36 on the first surface 32.

The first hinge device 15 may be coupled to the first panel 10 and the second panel 20. The first hinge device 15 may be coupled at or near the second surface 14 of the first panel 10 and at or near the second surface 24 of the second panel 20.

The first hinge device 15 may be coupled at or near the side surface 13 of the first panel 10 and at or near the side surface 23 of the second panel 20. FIG. 1 also shows a mesh 40 provided on the first hinge device 15. The mesh 40 may be made of polymer, rubber and/or metal, for example.

The second hinge device 25 may be coupled to the second panel 20 and the third panel 30. The second hinge device 25 may be coupled at or near the first surface 22, such as just below the display 26, and the second hinge device 25 may also be coupled to an area at (or near) the first surface 32 of the third panel 30, such as just below the display 36. The second hinge device 25 may also be at or near the second side surface 27 of the second panel 20 and at or near the side surface 33 of the third panel 30. FIG. 1 also shows a mesh 50 provided on the second hinge device 25. The mesh 50 may be made of polymer, rubber and/or metal, for example.

The second hinge device 25 may need to stretch when the mobile terminal is provided in (or moved into) an opened condition since the second hinge device 25 is immediately adjacent the displays 26 and 36 when in an opened state.

A data connector and/or a power connector may be provided between connections on the side surface 13 of the first panel 10 and the side surface 23 of the second panel 20 so as to allow data communication and/or power between the first panel 10 and the second panel 20. A data connector and/or a power connector may also be provided between connections on the side surface 27 of the second panel 20 and the side surface 33 of the third panel 30 so as to allow data communication and/or power between the second panel 20 and the third panel 30. As one example, a power source or a power supply may be provided on the second panel 20.

The data connectors and the power connectors between the respective panels may remain connected, based on a wire or other type of connector, even when the mobile device changes between a first arrangement (or tablet arrangement) and a second arrangement (or phone arrangement).

The second hinge device 25 may include a stretch mechanism 70 provided between the second panel 20 and the third panel 30. The stretch mechanism 70 may be a line or connection that includes a polymer, a metal and/or rubber. This may be used in conjunction with a spring and piston mechanism to allow the polymer line to stretch past the displays 26 and 36 when provided in the second arrangement.

The mobile device 1 may also include magnets at or near side surfaces of the panels 10, 20, 30. The magnets may aid the mobile device 1 when changing between a first (tablet) mode and a second (phone) mode. The magnets may keep the mobile device 1 closed in a second (phone) mode, as will be described below with respect to FIG. 2. The magnets may help push the panels 10, 20, 30 apart and into a first (tablet) mode, as will be described below with respect to FIG. 3. Still further, the magnets may help maintain the panels 10, 20, 30 together while in the first (tablet) mode, as shown in FIG. 3.

The magnets may be insulated from other electrical components of the mobile device 1.

The first hinge device 15 and the second hinge device 25 allow the panels 10, 20, 30 to change (or switch) between a first arrangement (i.e., a tablet arrangement) and a second arrangement (i.e., a phone arrangement). This may allow a user to use the mobile device 1 as a phone in the second (phone) arrangement and to switch (or change) the mobile device into a first arrangement (i.e., a tablet arrangement), such as one having a 16:9 display ratio.

FIG. 1 shows a first magnet 19 at or near the side surface 13 of the first panel 10, a second magnet 28 at or near the first side surface 23 of the second panel 20, a third magnet 29 at or near the second side surface 27 of the second panel 20 and a fourth magnet 39 at or near the first side surface 33 of the third panel 30. While FIG. 1 only shows one magnet at or near each side surface of the panels, other numbers of magnets may be provided at or near each of the side surfaces.

Each magnet may include a positive end and a negative end, such as a north pole and a south pole. The magnets may be arranged at or near the respective side surfaces such that a positive end portion of a first magnet will be magnetically coupled to a negative end portion of a second magnet.

Figure 2:
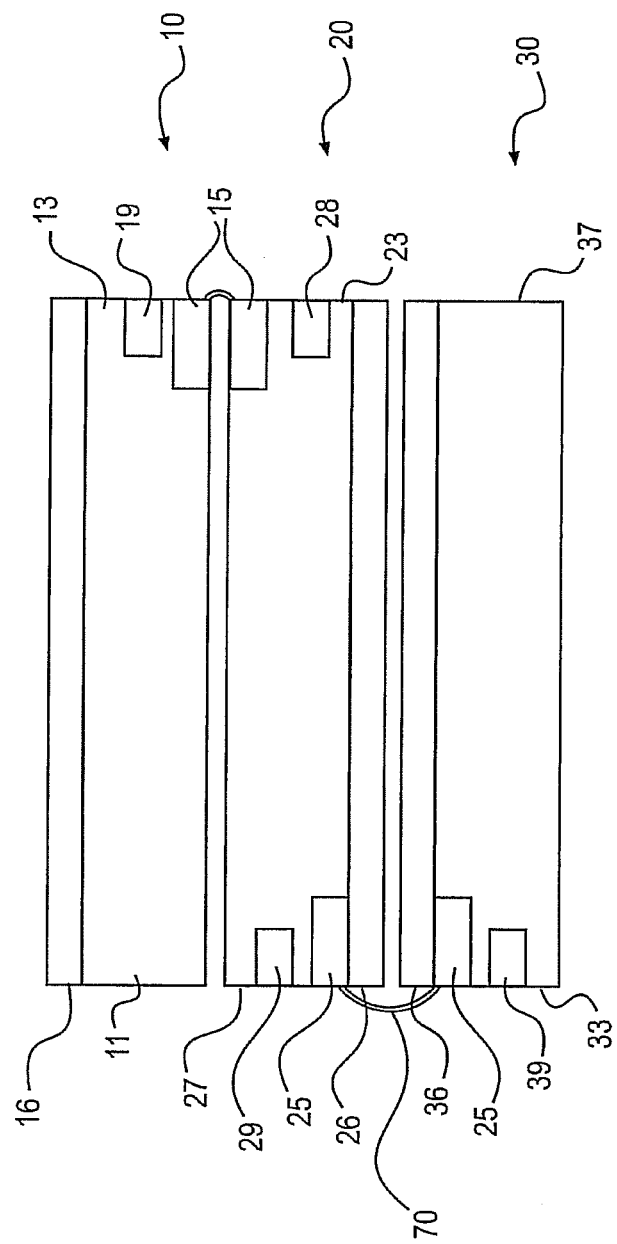
FIG. 2. shows a mobile device in an arrangement according to an example embodiment.
Figure 3:
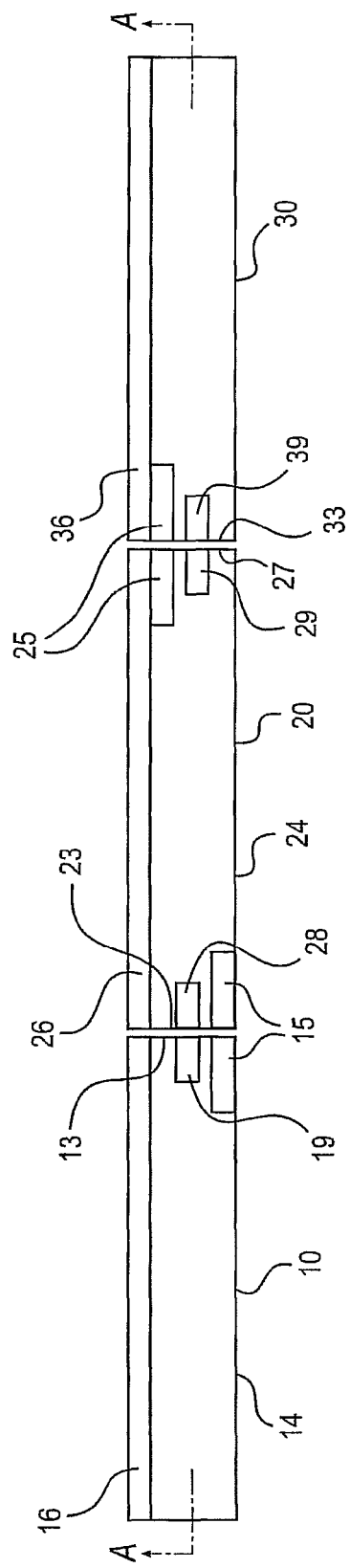
FIG. 3 shows a mobile device in an arrangement according to an example embodiment.

FIG. 2 shows a mobile device in a second arrangement according to an example embodiment. Other embodiments and configurations may also be provided.

More specifically, FIG. 2 shows the panels 10, 20 and 30 arranged in a stacked manner (or a second arrangement). The mobile device 1 thereby operates in a phone mode. In the phone mode, only the display 16 on the first panel 10 may operate since the displays 26 and 36 are covered by the other panels.

FIG. 2 shows that in the second (phone mode) arrangement, the side surface 13 of the front panel 10 is substantially vertically aligned with the side surface 23 of the second panel 20 and with a side surface 33 of the third panel 30. Additionally, in the second (phone mode) arrangement, a side surface 11 of the front panel 10 is substantially vertically aligned with the side surface 27 of the second panel 20 and the side surface 33 of the third panel 30.

FIG. 2 also shows the first hinge device 15 and the second hinge device 25. The second hinge device 25 may include the stretch mechanism 70 to allow the hinge device 25 to stretch when opened up.

FIG. 2 also shows the first magnet 19 at or near the side surface 13 being substantially vertically aligned with the second magnet 28 at or near the side surface 23. As one example, the positive end portion of the first magnet 19 may be magnetically coupled to the negative end portion of the second magnet 28, and the negative end portion of the first magnet 19 may be magnetically coupled to the positive end portion of the second magnet 28. Based on this arrangement, the first and second magnets 19, 28 may be magnetically attracted to each other. In the second (phone mode) arrangement, the positive end portion of the first magnet 19 may be magnetically attracted to the negative end portion of the second magnet 28, and the negative end portion of the first magnet 19 may be magnetically attracted to the positive end portion of the second magnet 28.

FIG. 2 also shows the third magnet 29 at or near the side surface 27 being substantially vertically aligned with the fourth magnet 39 at or near the side surface 33. As one example, the positive end portion of the third magnet 29 may be magnetically coupled to the negative end portion of the fourth magnet 39, and the negative end portion of the third magnet 29 may be magnetically coupled to the positive end portion of the fourth magnet 39. Based on this arrangement, the third and fourth magnets 29, 39 may be magnetically attracted to each other. In the second (phone mode) arrangement, the positive end portion of the third magnet 29 may be magnetically attracted (or coupled) to the negative end portion of the fourth magnet 39, and the negative end portion of the third magnet 29 may be magnetically attracted (or coupled) to the positive end portion of the fourth magnet 39.

The end portions of the magnets on different panels may be coupled (or attracted) to each other. This may help hold the panels together in the second (phone mode) arrangement.

FIG. 3 shows a mobile device in a first arrangement according to an example embodiment. Other embodiments and configurations may also be provided.

More specifically, FIG. 3 shows the panels 10, 20 and 30 arranged in an opened manner (or a first (tablet mode) arrangement). The mobile device 1 thereby operates in a tablet mode. In the first (tablet mode) arrangement, the display 16 on the first panel 10, the display 26 on the second panel 20 and the display 36 on the third panel 30 all operate to thereby provide a tablet type of display. For example, the second (phone mode) arrangement may have a 3:5 ratio (y axis: x axis), whereas in a first (tablet mode) arrangement, the overall width may increase three times such that a 9:5 ratio is provided. In the first arrangement, the mobile device may display content on the displays 16, 26, 36.

FIG. 3 shows that in the first (tablet mode) arrangement, the side surface 13 of the first panel 10 is adjacent to the side surface 23 of the second panel 20. Additionally, in the first (tablet mode) arrangement, the side surface 27 of the second panel 20 is adjacent to the side surface 33 of the third panel 30.

FIG. 3 also shows that in the first (tablet mode) arrangement, the first magnet 19 at or near the side surface 13 is substantially horizontally aligned with the second magnet 28 at or near the side surface 23. As one example, the positive end portion of the first magnet 19 may be magnetically coupled to the negative end portion of the second magnet 28. Thus, the first magnet 19 and the second magnet 28 may be magnetically attracted to each other.

FIG. 3 also shows the third magnet 29 at or near the side surface 27 is substantially horizontally aligned with the fourth magnet 39 at or near the side surface 33. As one example, the positive end portion of the third magnet 29 may be magnetically coupled to the negative end portion of the fourth magnet 39. Thus, the third magnet 29 and the fourth magnet 39 may be magnetically attracted to each other.

The edge portions of the magnets on different panels may be coupled (or attracted) to each other. This may help hold the panel together in the first (tablet mode) arrangement.

While in the first (tablet mode) arrangement, a user may hold the mobile device by gripping or holding at least the first panel 10 and possibly the second panel 20. This may apply an upward force from the user's hand. Accordingly, because the first hinge device 15 is on the second surface 14 of the first panel 10 and the second surface 24 of the second panel 10, and the force is exerted upward on the second surfaces 14, 24, the first hinge device 15 may be under tension and the side surfaces 13, 33 may experience compression, which may help maintain the substantially horizontal arrangement of the displays 16, 26 forming part of the tablet display.

Additionally, gravity may apply a downward force at least to the first surface 32 of the third panel 30. Accordingly, because the second hinge device 25 is located immediately under or near the display 36 of the third panel 30, and the gravity force is exerted downward on the first surface 32, the second hinge device 25 may be under tension and the side surfaces 27, 33 may experience compression, which may help maintain the substantially horizontal arrangement of the displays 26, 36 forming part of the tablet display.

Figure 4:
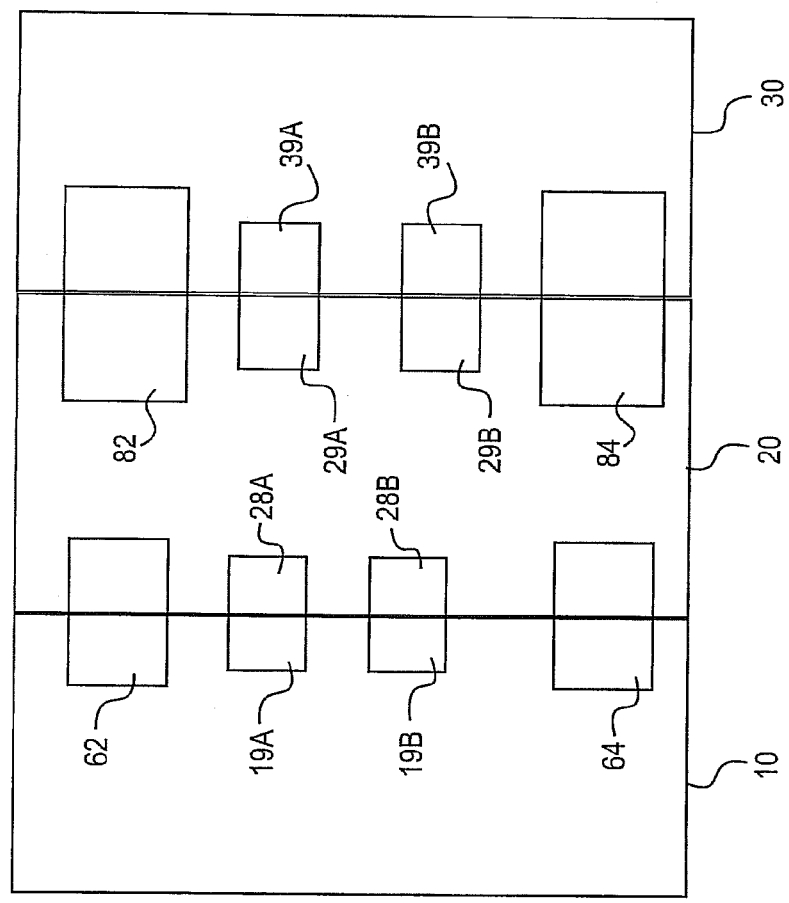
FIG. 4 shows a cross section of the mobile device according to an example embodiment.

FIG. 4 shows a cross section of the mobile device according to an example embodiment. Other embodiments and configurations may also be provided. More specifically, FIG. 4 shows a cross section of the mobile device 1 taken along line A-A of FIG. 3.

FIG. 4 shows one example of different magnets and connections between the panels. For example, FIG. 4 shows that the first panel 10 includes first magnets 19A, 19B, a first data connection 62 and a first power connection 64 on the side surface 13. FIG. 4 also shows that the second panel 20 includes second magnets 28A, 28B, the first data connection 62 and the first power connection 64 at or near the side surface 23. The second panel 20 also includes third magnets 29A, 29B, a second data connection 82 and a second power connection 84 at or near the side surface 27. FIG. 4 also shows that the third panel 30 includes fourth magnets 39A, 39B, the second data connection 82 and the second power connection 84 at or near the side surface 33.

In the first (tablet mode) arrangement, the first data connection 62 may be connected between the first and second panels 10, 20 such that data may be exchanged between the first panel 10 and the second panel 20. The first power connection 64 may be connected between the first and second panels 10, 20 such that power may be exchanged between the first panel 10 and the second panel 20. The first magnets 19A, 19B may be separately aligned with the second magnets 28A, 28B. As one example, the positive end portion of the first magnet 19A may be magnetically coupled to the negative end portion of the second magnet 28B, and the positive end portion of the first magnet 19B may be magnetically coupled to the negative end portion of the second magnet 28B.

In the first (tablet mode) arrangement, the second data connection 82 may be connected between the second and third panels 20, 30 such that data may be exchanged between the second panel 20 and the third panel 30. The second power connection 84 may be connected between the second and third panels 20, 30 such that power may be exchanged between the second panel 20 and the third panel 30. The third magnets 29A, 29B may be separately aligned with the fourth magnets 39A, 39B. As one example, the positive end portion of the third magnet 29A may be magnetically coupled to the negative end portion of the fourth magnet 39A, and the negative end portion of the third magnet 29B may be magnetically coupled to the positive end portion of the fourth magnet 39B.

The data connections provide channels for power and data connection between the various panels. The magnets may help in rotation and joining of the panels.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile device comprising:
a communication device to provide wireless communication;
a first panel having a first surface, a second surface and a side surface between the first surface and the second surface of the first panel, the first panel having a display on the first surface of the first panel;
a second panel having a first surface, a second surface and a first side surface between the first surface and the second surface of the second panel, the second panel having a display on the first surface of the second panel;
a first hinge device to couple the first panel to the second panel, wherein the first hinge device is to allow the mobile device to be placed in a first arrangement of the first and second panels or in a second arrangement of the first and second panels;
a first magnet at or near the side surface of the first panel, the first magnet including a first end portion having a first polarity and a second end portion having a second polarity; and
a second magnet at or near the first side surface of the second panel, the second magnet including a first end portion having the second polarity and a second end portion having the first polarity;
a third panel having a first surface, a second surface and a side surface between the first surface and the second surface of the third panel, the third panel having a display on the first surface of the third panel; and
a second hinge device to couple the second panel to the third panel, wherein the second panel includes a second side surface between the first surface and the second surface of the second panel, and a third magnet is at or near the second side surface of the second panel,
wherein the first hinge device is on the second surface of the first panel and is on the second surface of the second panel, wherein the second hinge device is below the display at the second panel such that the second hinge device at the second panel is between the display at the second panel and the third magnet,
in the first arrangement of the first and second panels, the first end portion having the first polarity of the first magnet is magnetically coupled to the first end portion having the second polarity of the second magnet, and the second end portion having the second polarity of the first magnet is magnetically coupled to the second end portion having the first polarity of the second magnet.

2. The mobile device of claim 1, wherein in the first arrangement, the mobile device to display content on the display of the first panel and the display of the second panel.

3. The mobile device of claim 1, wherein in the first arrangement, the mobile device is to provide an extended display.

4. The mobile device of claim 1, wherein the mobile device is to operate as a phone when in the second arrangement.

5. The mobile device of claim 1, wherein in the first arrangement, the first side surface of the first panel is adjacent the first side surface of the second panel, and the first end portion of the first magnet is magnetically coupled to the first end portion of the second magnet.

6. The mobile device of claim 5, wherein the first end portion having the first polarity of the first magnet has a different polarity than the first end portion having the second polarity of the second magnet.

7. The mobile device of claim 1, wherein in the second arrangement, the second surface of the second panel is adjacent the second surface of the first panel.

8. The mobile device of claim 1, wherein in the first arrangement, the side surface of the first panel is adjacent the first side surface of the second panel, the side surface of the third panel is adjacent the second side surface of the second panel, the first end portion of the first magnet is magnetically coupled to the first end portion of the second magnet and a first end portion of the third magnet is magnetically coupled to a first end portion of a fourth magnet at or near the side surface of the third panel.

9. The mobile device of claim 8, wherein the first end portion of the first magnet has a different polarity than the first end portion of the second magnet, and the first end portion of the third magnet has a different polarity than the first end portion of the fourth magnet.

10. The mobile device of claim 8, wherein in the second arrangement of the first and second panels, the first magnet at the first panel is between the display of the first panel and a portion of the first hinge device at the first panel, and
   the second hinge device at the third panel is between the display at the third panel and a fourth magnet at the side surface of the third panel.

11. The mobile device of claim 1, wherein the second hinge device includes a stretch mechanism to stretch when the mobile device is changed from the second arrangement to the first arrangement.

12. The mobile device of claim 1, further comprising:
   a data connection between the side surface of the first panel and the first side surface of the second panel; and
   a power connection between the side surface of the first panel and the first side surface of the second panel.

13. A mobile device comprising:
   a communication device to provide wireless communication;
   a first panel having a first surface, a second surface and a side surface between the first surface and the second surface of the first panel, the first panel having a display on the first surface of the first panel;
   a second panel having a first surface, a second surface and a first side surface between the first surface and the second surface of the second panel, the second panel having a display on the first surface of the second panel;
   a first hinge device to couple the first panel to the second panel, wherein the first hinge device is to allow the mobile device to be placed in a first arrangement of the first and second panels or in a second arrangement of the first and second panels;
   a first magnet at or near the side surface of the first panel, the first magnet including a first end portion having a first polarity and a second end portion having a second polarity;
   a second magnet at or near the first side surface of the second panel, the second magnet including a first end portion having the second polarity and a second end portion having the first polarity,
   in the first arrangement of the first and second panels, the first end portion having the first polarity of the first magnet is magnetically coupled to, and aligned with, the first end portion having the second polarity of the second magnet, and the second end portion having the second polarity of the first magnet is magnetically coupled to, and aligned with, the second end portion having the first polarity of the second magnet,
   a third panel having a first surface, a second surface and a side surface between the first surface and the second surface of the third panel, the third panel having a display on the first surface of the third panel; and
   a second hinge device to couple the second panel to the third panel, wherein the second panel includes a second side surface between the first surface and the second surface of the second panel, and a third magnet is at or near the second side surface of the second panel, and a fourth magnet is at or near the side surface of the third panel,
   wherein the first hinge device is on the second surface of the first panel and is on the second surface of the second panel, wherein the second hinge device is below the display at the second panel such that the second hinge device at the second panel is between the display at the second panel and the third magnet, and the second hinge device is below the display at the third panel such that the second hinge device at the third panel is between the display at the third panel and the fourth magnet,
   wherein in the first arrangement, the first magnet at the first panel is between the display of the first panel and a portion of the first hinge device at the first panel.

14. The mobile device of claim 13, wherein in the first arrangement, the mobile device to display content on the display of the first panel and the display of the second panel.

15. The mobile device of claim 13, wherein in the first arrangement, the mobile device is to provide an extended display.

16. The mobile device of claim 13, wherein the mobile device is to operate as a phone when in the second arrangement.

17. The mobile device of claim 13, wherein in the first arrangement, the side surface of the first panel is adjacent the first side surface of the second panel.

18. The mobile device of claim 13, wherein in the second arrangement, the second surface of the second panel is adjacent the second surface of the first panel.

19. The mobile device of claim 13, wherein in the first arrangement, the side surface of the first panel is adjacent the first side surface of the second panel, the side surface of the third panel is adjacent the second side surface of the second panel, a first end portion of the third magnet is magnetically coupled to a first end portion of a fourth magnet at or near the side surface of the third panel.

20. The mobile device of claim 19, wherein in the second arrangement of the first panel and the second panel, the first magnet at the first panel is between the display of the first panel and a portion of the first hinge device at the first panel.

21. The mobile device of claim 13, wherein the second hinge device includes a stretch mechanism to stretch when the mobile device is changed from the second arrangement to the first arrangement.

22. The mobile device of claim 13, further comprising:
   a data connection between the side surface of the first panel and the first side surface of the second panel; and
   a power connection between the side surface of the first panel and the first side surface of the second panel.

* * * * *